United States Patent [19]

O'Neil et al.

[11] Patent Number: 4,812,629

[45] Date of Patent: Mar. 14, 1989

[54] METHOD AND APPARATUS FOR VENDING

[75] Inventors: James P. O'Neil; Ken R. Powell, both of San Diego, Calif.

[73] Assignee: Term-Tronics, Incorporated, San Diego, Calif.

[21] Appl. No.: 42,594

[22] Filed: Apr. 23, 1987

Related U.S. Application Data

[63] Continuation of Ser. No. 708,897, Mar. 6, 1985, abandoned.

[51] Int. Cl.⁴ ............................................. G06K 15/00
[52] U.S. Cl. .................................... 235/383; 235/381; 235/462; 194/217; 221/13; 360/92
[58] Field of Search ............... 235/375, 383, 381, 462, 235/383; 360/92, 12; 194/217; 221/13, 79, 127

[56] References Cited

U.S. PATENT DOCUMENTS

| Re. 32,115 | 4/1986 | Lockwood et al. ............ 194/217 X |
| 3,224,544 | 12/1965 | Shoher et al. . |
| 3,718,906 | 2/1973 | Lightner . |
| 3,831,197 | 8/1974 | Beach et al. ................... 360/92 X |
| 3,854,605 | 12/1974 | Proper et al. . |
| 3,938,190 | 2/1976 | Semmlow et al. .................. 360/92 |
| 4,134,537 | 1/1979 | Glaser et al. . |
| 4,141,078 | 2/1979 | Bridges, Jr. et al. . |
| 4,275,425 | 6/1981 | Watanabe et al. ..................... 360/92 |
| 4,300,040 | 11/1981 | Gould et al. . |
| 4,414,467 | 11/1983 | Gould et al. . |
| 4,458,802 | 7/1984 | MacIver et al. . |
| 4,519,522 | 5/1985 | McElwee ......................... 235/462 X |
| 4,598,810 | 7/1986 | Shore et al. . |

Primary Examiner—David L. Trafton
Attorney, Agent, or Firm—Finnegan, Henderson, Farabow, Garrett & Dunner

[57] ABSTRACT

A video cassette vending machine has a plurality of storage positions which are not user-accessible and a vend position which is user-accessible. A carrier unit is provided for carrying a selected video cassette between one of the storage positons and the vend position. a positioning unit is provided for positioning the carrier unit proximate to a selected storage position in response to user input. An engaging unit fixed to the carrier unit is provided for engaging and disengaging a selected video cassette. A reader unit is provided for identifying a selected video cassette. A microprocessor memory system is provided for recording and processing information about the contents of the storage positions and the identity of the selected video cassette.

13 Claims, 16 Drawing Sheets

FIG. 13.

③ VV: TRANSPORT INSTRUCTED TO VEND TAPE

DISPLAY: ASK IF RENT OR PURCHASE, SHOW CHARGE FOR EACH

CUSTOMER: SELECTS RENT OR PURCHASE

VV: CALCULATE CHARGES, UPDATE MEMORY TO REFLECT THIS TRANSACTION. IF RENTAL, CROSS REFERENCE TITLE TO CUSTOMER CHARGE CARD

DISPLAY: WAIT FOR TAPE

WHEN TAPE IS DELIVERED:

VV: OPEN ACCESS DOOR

DISPLAY: REMOVE TAPE

PRINTER: TRANSACTION RECORD

WHEN TAPE REMOVED:

DISPLAY: REMOVE RECEIPT

WHEN RECEIPT TAKEN:

DISPLAY: ASK IF ANOTHER TAPE DESIRED

CUSTOMER: RESPONDS YES OR NO

IF YES → ②     IF NO → ①

METHOD AND APPARATUS FOR VENDING

This application is a continuation, of application Ser. No. 708,897, filed Mar. 6, 1985, now abandoned.

BACKGROUND OF THE INVENTION

1. Field of the Invention

The present invention relates to a method and apparatus for vending a selected item to a customer from a vending machine, and particularly, a method and apparatus for vending items such as video cassettes.

2. Description of the Prior Art

As home video cassette players have become more popular, a need has arisen to provide prerecorded video cassettes for home viewing. Such video cassettes can be purchased or rented from selected stores. In addition, various arrangements have been proposed for allowing a consumer to select and either purchase or rent a video cassette from an unattended terminal. For example, U.S. Pat. No. 4,414,467 to Gould et al. discloses a vending machine which dispenses a selected video cassette to a customer. After viewing, the video cassette can be returned to the vending machine. A similar machine is shown in U.S. Pat. No. 4,300,040 to Gould et al.

However, such arrangements have disadvantages which reduce the efficiency of their operation and require frequent attention from trained service people.

Accordingly, it is an object of the present invention to provide a method and apparatus for dispensing selected items such as video cassettes which is efficient in operation and which does not require frequent attention by trained service people.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a dispensing machine is provided comprising a plurality of storage positions which are not user-accessible and at least one vend position which is user-accessible; carrier means for carrying a selected item between one of the storage positions and the vend position; positioning means for positioning the carrier means proximate to a selected storage position in response to user input; engaging means fixed to the carrier means for engaging and disengaging a selected item; reader means for identifying a selected item; and memory means for storing and processing information about the contents of the storage positions and the identity of a selected item.

A method for dispensing a selected item for storage array in the machine including a plurality of storage positions is provided comprising the steps of manually entering a selection request for a selected item, automatically positioning a carrier proximate to a designated storage position containing the selected item in response to the request, engaging the selected item for movement by the carrier, positioning the carrier and the engaged selected item at a vend position, recording the empty condition of the designated storage position in a memory system, and dispensing the selected item to a customer. In addition, a method for redepositing a selected item in a dispensing machine is provided comprising the steps of placing a selected item in a position which is both machine accessible and user-accessible, reading the identity of the selected item, engaging the selected item for movement with the carrier, positioning the carrier proximate to a designated storage position for the selected item, and depositing the selected item in the designated storage position.

BRIEF DESCRIPTION OF THE DRAWINGS

The accompanying drawings, which are incorporated in and constitute a part of the specification, illustrate a preferred embodiment of the invention, and, together with a general description of the invention given above and a detailed description of the preferred embodiment given below, serve to explain the principles of the invention.

FIG. 13 is a flow diagram representation describing transport sequence of operation of the vending apparatus;

DESCRIPTION OF THE PREFERRED EMBODIMENTS

Reference will now be made in detail to the present preferred embodiments of the invention as illustrated in the accompanying drawings. It should be clear that the method and apparatus are preferably used and to vend video cassettes as illustrated below, but may also be used to vend other items in a similar manner.

In accordance with the present invention, there is provided a dispensing machine comprising a plurality of storage positions which are not user-accessible and at least one vend position which is user-accessible, carrier means for carrying a selected item between one of said storage positions and said vend position, positioning means for positioning said carrier means proximate to a selected storage position in response to user input, engaging means fixed to said carrier means for engaging and disengaging a selected item, reader means for identifying a selected item, and memory means for storing and processing information about the contents of the storage positions and the identity of a selected item.

Figure 1:
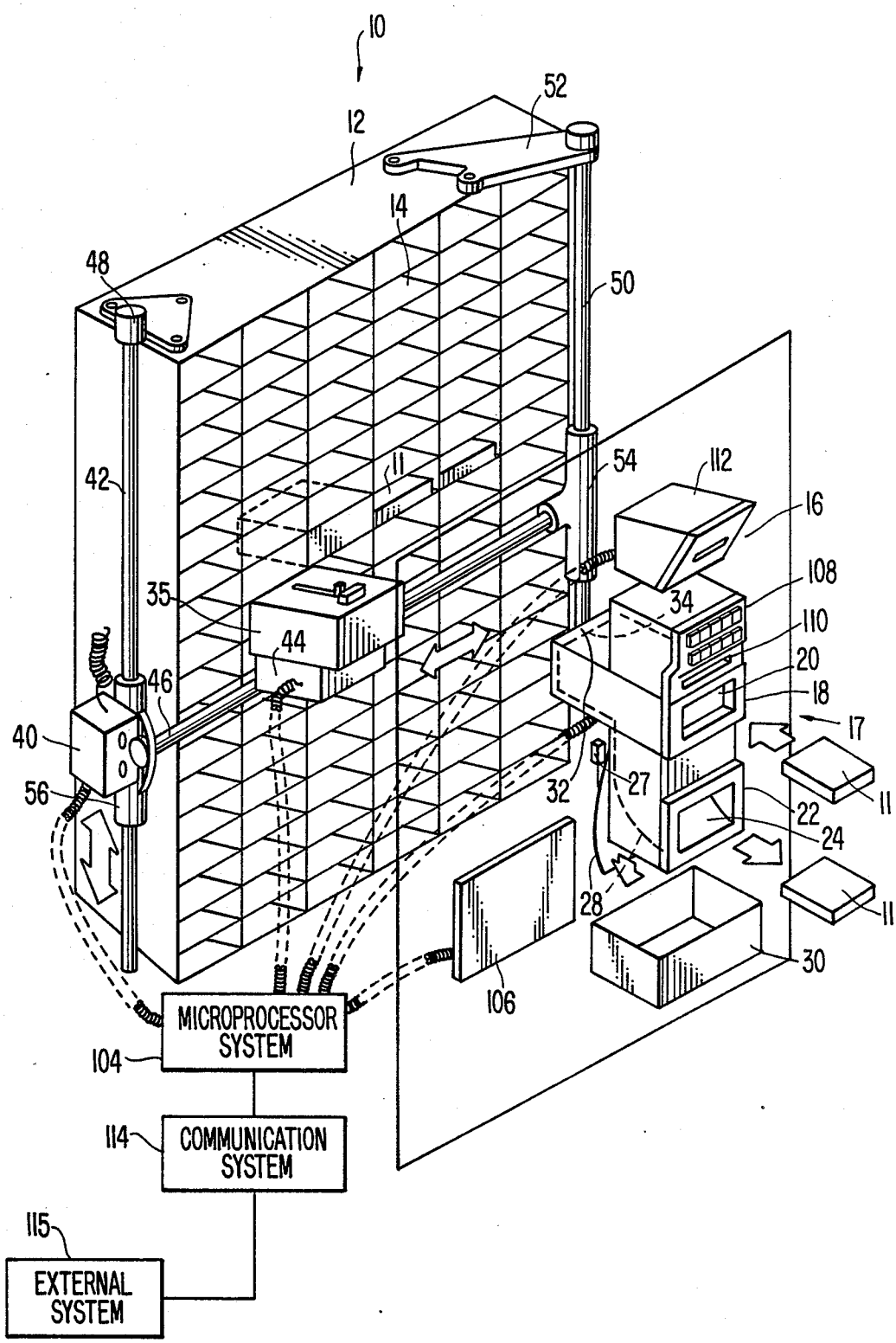
FIG. 1 is a perspective view of a vending apparatus incorporating the teachings of the present invention.
Figure 2:
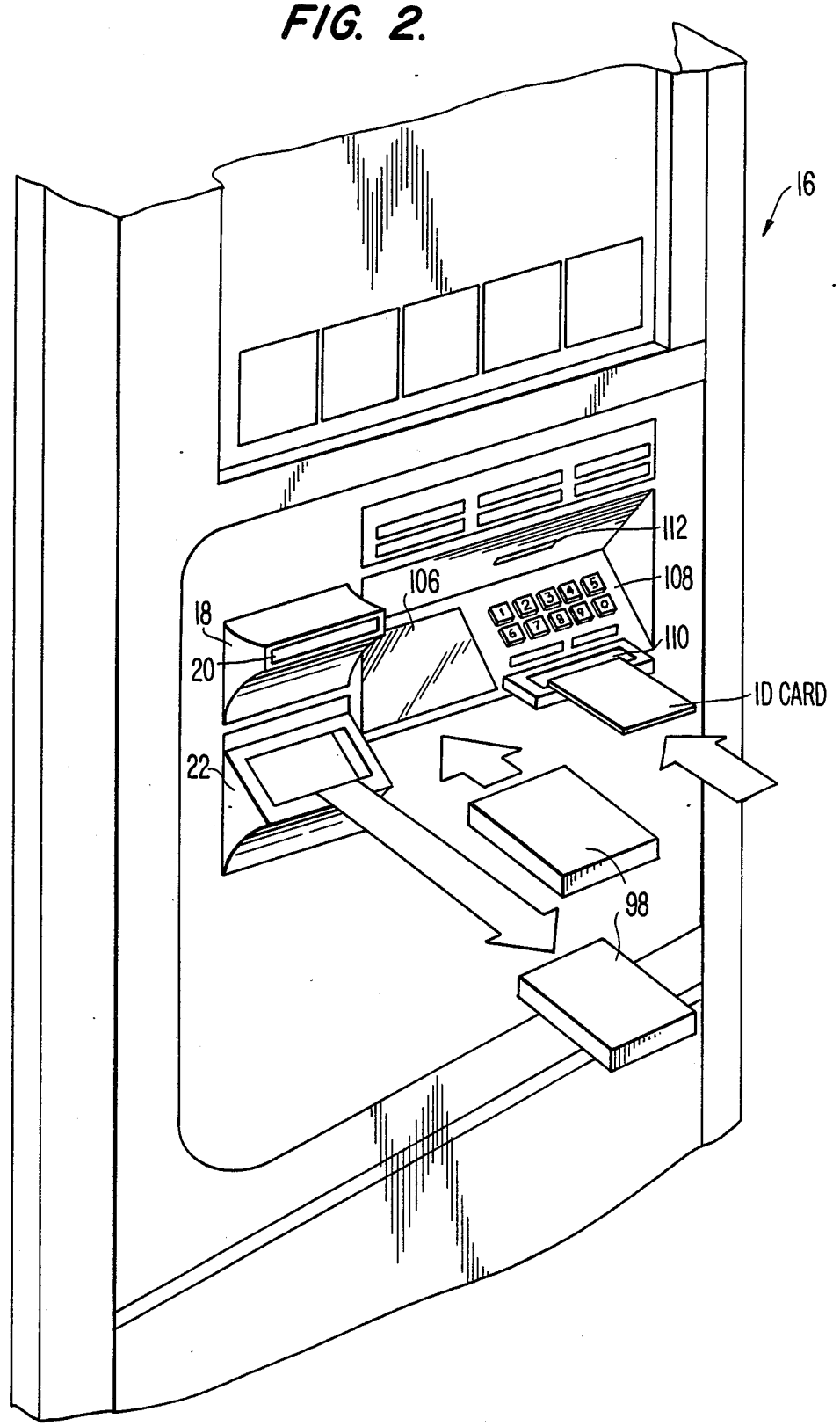
FIG. 2 is a perspective view of a front panel for the vending apparatus shown in FIG. 1.

FIG. 1 shows a dispensing machine 10 having a storage rack 12 with a plurality of storage positions for receiving a number of video cassette cartridges 11. The storage positions comprise a two dimensional array of vertically and horizontally arranged supports 14 forming a coordinate matrix array of compartments.

A front panel 16 covers and is spaced from storage rack 12 to make the storage positions defined by supports 14 inaccessible in a direct fashion to a user of the machine. The dispensing machine also includes a vend position 17 which is directly accessible to a user. The vend position 17 preferably includes an insertion station means such as housing 18 having an opening 20 of sufficient size to accommodate a video cassette cartridge and case or any other selected item which is vended by the machine. The vend position 17 also preferably includes a dispensing station means such as housing 22 with opening 24 through which selected video cassette cartridges are dispensed. Like opening 18, opening 24 is large enough to accommodate a video cassette cartridge 11 or any other items to be vended by the machine. Opening 24 is preferably below opening 20 and connected to opening 20 by a chute 26.

A pivotal door means 28 is positioned below the insertion station housing 18 in chute 26. Door means 28 can assume a position shown in FIG. 1 in broken line which allows video cassettes falling through chute 26 to be ejected through opening 24. Door means 28 can also be actuated by a solenoid 27, to pivot to a second position shown in solid line such that chute 26 will be unblocked by door means 28 so that video cassettes will drop through chute 26 through an opening 30 into a storage area for damaged video cassettes such as a open topped box 30.

Figure 5A:
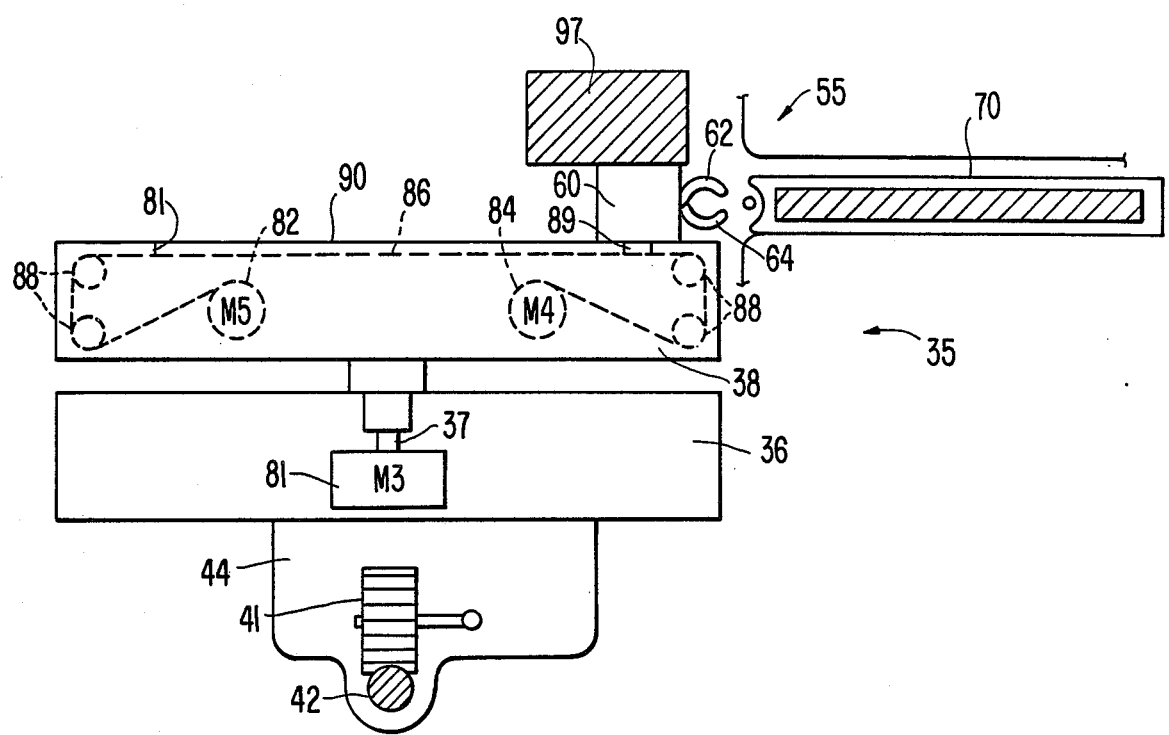
FIGS. 5a and 5b are side elevational views of details of the carrier means and associated components incorporating the teachings of the present invention.

Carrier means 35 is provided for carrying a selected item such as a video cassette, between one of the storage positions defined by supports 14 and the vend position 17 which includes transfer housing 32 having opening 34. Opening 20 in insertion station housing 18 communicates with opening 34 in transfer housing 32 so that a video cassette can be passed between opening 34 and opening 20. FIG. 5a illustrates carrier means 35 for carrying a selected item such as a video cassette between one of the storage positions in storage rack 12 and the vend position 17. As shown, the carrier means 35 preferably includes a base 36 and a rotatable table 38 which is mounted on a shaft 37 and is rotatable relative to base 36 in a horizontal plane by a motor 81.

Dispensing machine 10 also includes positioning means for positioning the carrier means proximate to a selected storage position in response to user input. As shown in FIG. 1, the positioning means preferably includes a first transport means such as a vertically running motor 40 which positions itself along a vertically extending rod 42. The positioning means also includes a second transport means such as horizontally running motor 44 which positions itself along horizontally extending rod 46.

Motors 40 and 44 may be driven along rods 42 and 46, respectively, by a rack and pinion arrangement wherein rods 42 and 46 are geared racks and wherein motors 40 and 44 include driven pinions 41 for engaging those racks. Vertically extending rod 42 is fixed in position on storage rack 12 by bracket 48 which engages an end of vertically extending rod 42. A second vertically extending smooth surfaced rod 50 is positioned on the opposite side of storage rack 12 and is held in place by bracket 52. One end of horizontally extending rod 46 is fixed to T-shaped sliding bearing member 54 which allows horizontally extending rod 46 to slide along second vertically extending rod 50. The other end of horizontally extending rod 46 is attached to a second sliding member 56 which is also attached to and serves a mount for the vertically running motor 40. Second sliding member 56 is slidable along vertically extending rod 42 and is driven along vertically extending rod 42 by vertically running motor 40. In this way, vertically running motor 40 can be actuated to vertically position vertically running motor 40, second sliding member 56, T-shaped sliding member 54, horizontally extending rod 46, and horizontally running motor 44 attached to horizontally extending rod 46. Thus, horizontally running motor 44 is vertically positioned by vertically running motor 40. It can be seen that horizontally running motor 44 is attached to base 36 of carrier means 35 for positioning carrier means 35 proximate to a selected storage position in storage rack 12 in response to user input.

Figure 6A:
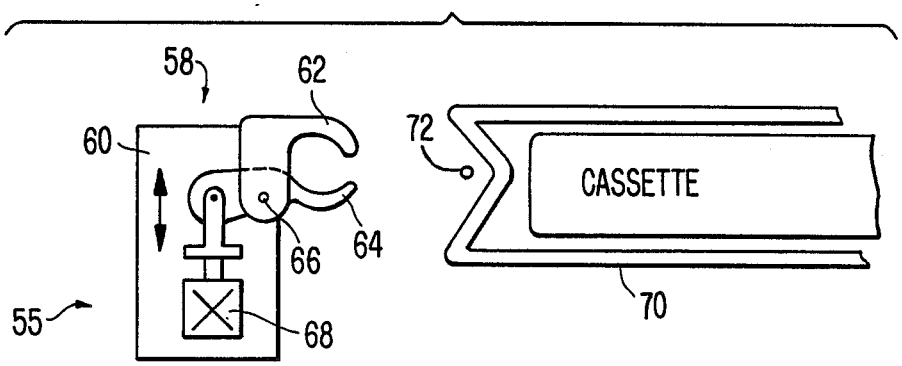
FIGS. 6a and 6b are side elevational views of the engaging means incorporating the features of the present invention.

As shown in FIGS. 5a and 6a, engaging means 55 is fixed to carrier means 35 for engaging, holding and disengaging a selected item. As shown in FIG. 6a, the engaging means 55 comprises a mechanical finger means 58 including an engaging means support 60 which is fixed to rotatable table 38. Relatively movable fingers 62 and 64 are pivoted about pivot shaft 66 by a solenoid 68, fixed to engaging means support 60. When such an arrangement is used, a selected video cassette is housed in a special case 70 having a bar 72 mounted on case 70 for engagement between fingers 62 and 64.

Figure 6B:
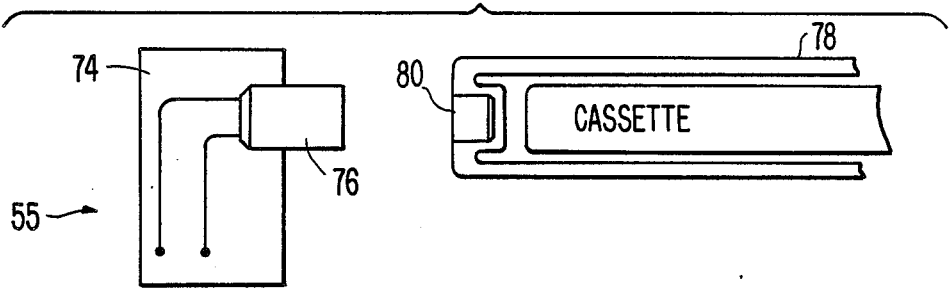

An alternative engaging means 55 is seen in FIG. 6b. An engaging means support 74 is attached to rotatable table 38 and contains a magnetic means such as electromagnet 76 which is selectively energized to create a magnetic field. When this embodiment of the engaging means 55 is used, a second special video cassette case 78 is used to house a selected video cassette such that case 78 contains a slug or section 80 of magnetizable or magnetic material seated in case 78 for magnetic attraction and engagement by the electromagnet 76.

In this manner, the engaging means 55 mounted on carrier means 35 can engage or disengage a video cassette item at one of the supports 14 in storage rack 12 or engage a video cassette place in transfer housing 32. It is noted that since the engaging means supports 60 or 74 are fixed to rotatable table 38 they are rotatable with rotatable table 38 relative to base 36. Rotatable table 38 includes translational movement means such as winding motors 82 and 84 which alternatively drive shuttle belt 86 between them and along guide pulleys 88 so that belt 86 translates back and forth parallel to the top surface 90 of rotatable table 38 Belt 86 is fixed by a drive dog 89 to engaging means support 60 through an elongated longitudinal slot 81 in top surface 90 of rotatable table 38.

Figure 5B:
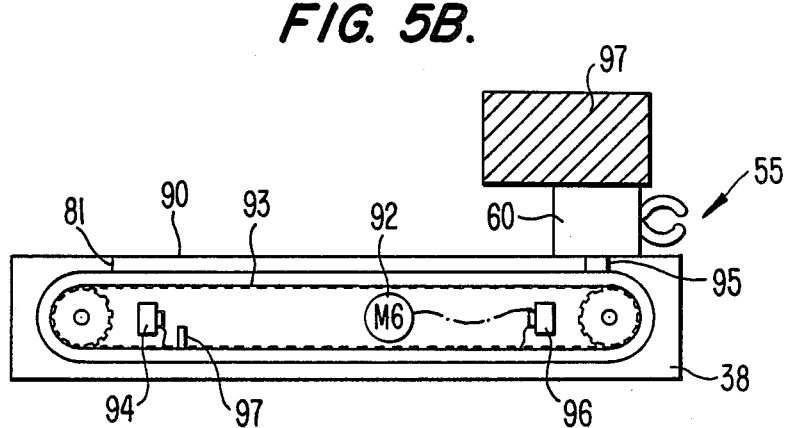

As shown in FIG. 5b, engaging means support 60 can alternatively be driven along rotatable table 38 by a reversible motor 92 which drives a sprocket 91 meshing with a toothed timing belt 93 which is attached by a suitable coupling 95 to engaging means support 60 through an elongational longitudinal slot 81 in top surface 90 of rotatable table 38. Timing belt 93 includes a switch actuation tab 97 for operating limit switches 94 and 96 to stop reversible motor 92 when engaging means support 60 is in a limit position near either end of rotatable table 38. Therefore, it is seen that engaging means support 60 is supported by the rotatable table 38 while being mounted for translational movement relative to rotatable table 38. These facilities enable movement of the engaging means to advance and withdraw video cassettes from storage rack 12 and further deposit cassettes in and remove cassettes from transfer housing 32.

Figure 4:
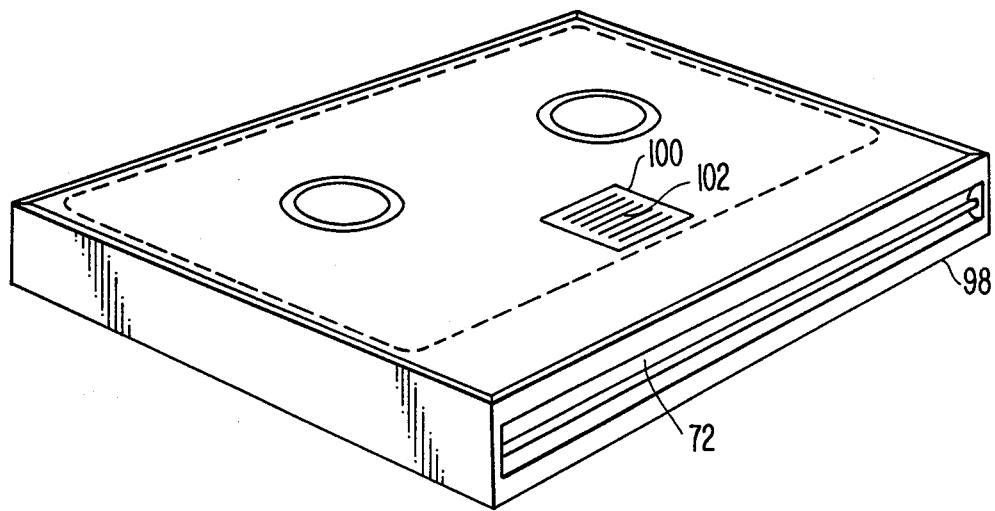
FIG. 4 is a perspective view of a video cassette cartridge and case which is to be vended from the vending apparatus shown in FIG. 1.

Dispensing machine 10 also includes reader means for identifying a selected item. As shown in FIGS. 5a and 5b, such reader means includes a reader head 97 which is preferably capable of reading a bar code. As seen in FIG. 4, the video cassettes are stored in cases 98 having a window 100 which is aligned with a portion of the video cassette inside case 98 which displays a bar code 102 indicating the identity of the particular video cassette. Bar code 102 is readable by the bar code reader in reader head 97. As can be seen from FIGS. 5a and 5b, reader means such as reader head 97 is fixed to engaging means support 60 of engaging means 55 for movement therewith. Since the reader means is fixed to engaging means 55 and engaging means 55 is fixed to the rotatable table 38, the reader means also moves with rotatable table 38. In addition, since rotatable table 38 is part of carrier means 35, the engaging means 55 moves with carrier means 35.

It can be seen from FIG. 1 that carrier means 35 is positionable over a locus that defines the plane between a plurality of storage positions such as the two-dimensional array of supports 14 and the transfer housing 32 of vend position 17.

Figure 8:
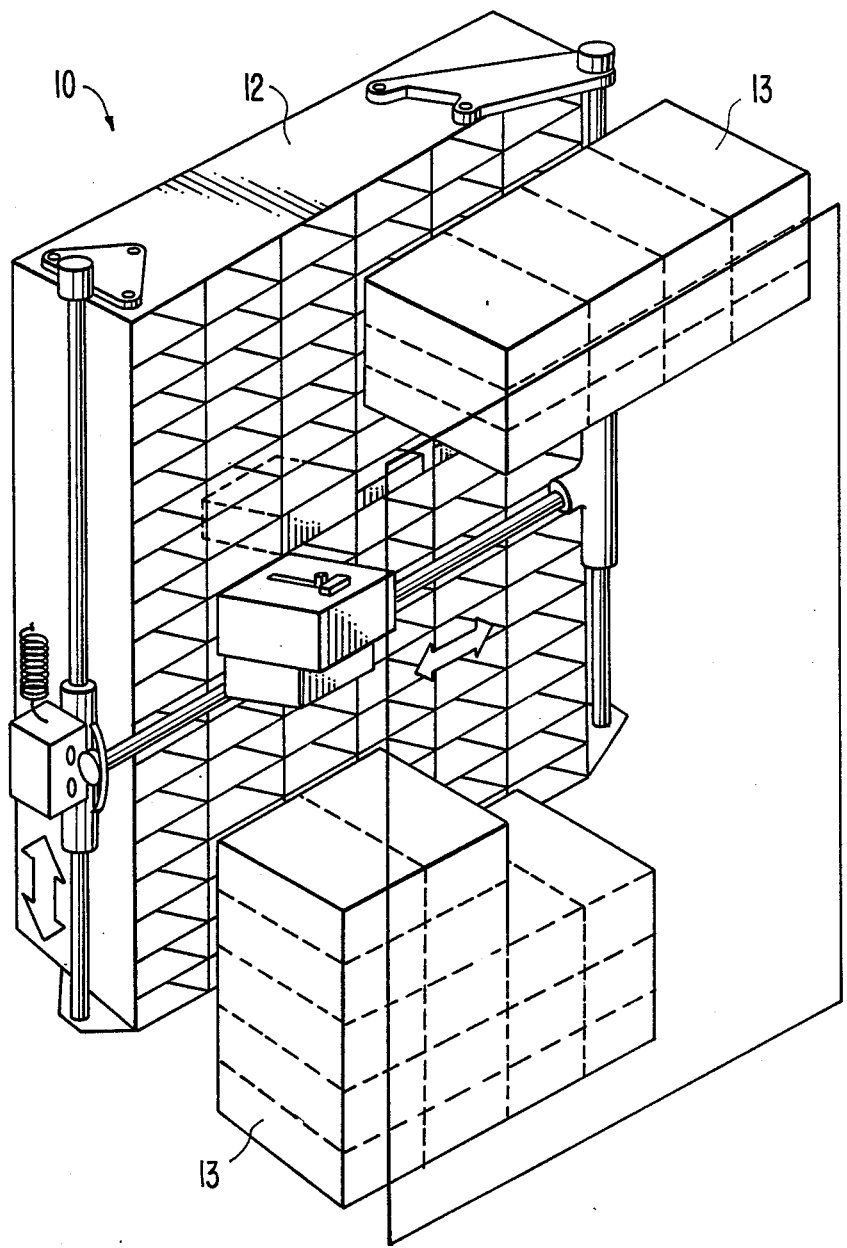
FIG. 8 is a perspective view of the storage area of FIG. 1 with additional auxiliary storage racks.

As can be seen from FIG. 8, dispensing machine 10 optionally includes auxiliary storage racks 13 similar to storage rack 12. Auxiliary storage racks 13 are positioned in an arrangement which is spaced from storage rack 12 to allow carrier means 35 to access either storage rack 12 or auxiliary storage rack 13 from their respective inwardly facing sides. The provision of rotatable table 38 on carrier means 35 allows engaging means 55 to engage video cassette cartridges stored in either storage rack 12 or auxiliary storage rack 13. In this manner, a greater variety or quantity of video cassettes may be stored in an individual dispensing machine 10.

Figure 9:
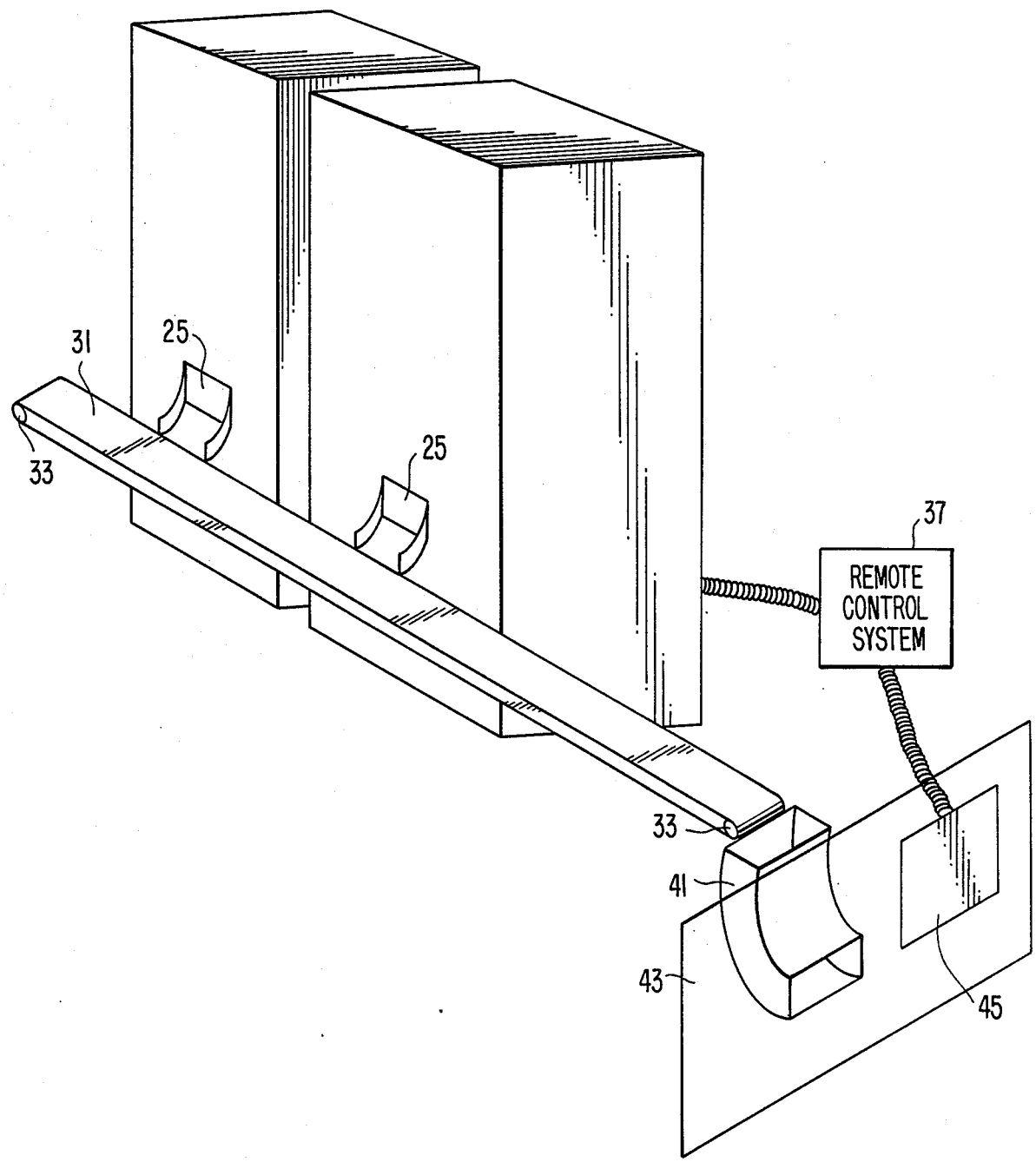
FIG. 9 is a perspective view of a configuration of multiple vending apparatus.

An arrangement for further increasing the variety or quantity of available video cassettes is shown in FIG. 9. A plurality of dispensing machines 10 include a multiple operation exit point similar to or convertible from dispensing station housing 22. When a selected tape is issued from the multiple operation exit point 25, gravity causes the tape to be directed down a chute onto conveyor belt 31 and thereby transported to the desired location. As shown in FIG. 9, dispensing machines 10 may be arranged in a row along one side of the conveyor belt 31. Alternatively, dispensing machines 10 may be arranged on both sides of conveyor belt 31.

In addition to increasing the quantity of video cassettes available, this arrangement is particularly useful in a situation requiring higher security than usual. In such a situation, dispensing machines 10 may be located inside a building and the video cassettes may be dispensed by conveyor belt 31 to a customer on the outside of the building through a chute 41 which passes through a wall 43 in the building. In addition, such wall would have an input select panel 45 by which customers could request a particular video cassette as described below.

Dispensing machine 10 also comprises a memory means for storing and processing information about the contents of the storage positions and the identity of the selected item such as the bar code representing the title of a particular video cassette. Preferably, the memory means includes a microprocessor system 104 which can receive, transmit, and remember information about the contents of the storage positions and the identity of a selected item such as the bar code representing the title of a particular video cassette.

Figure 10:
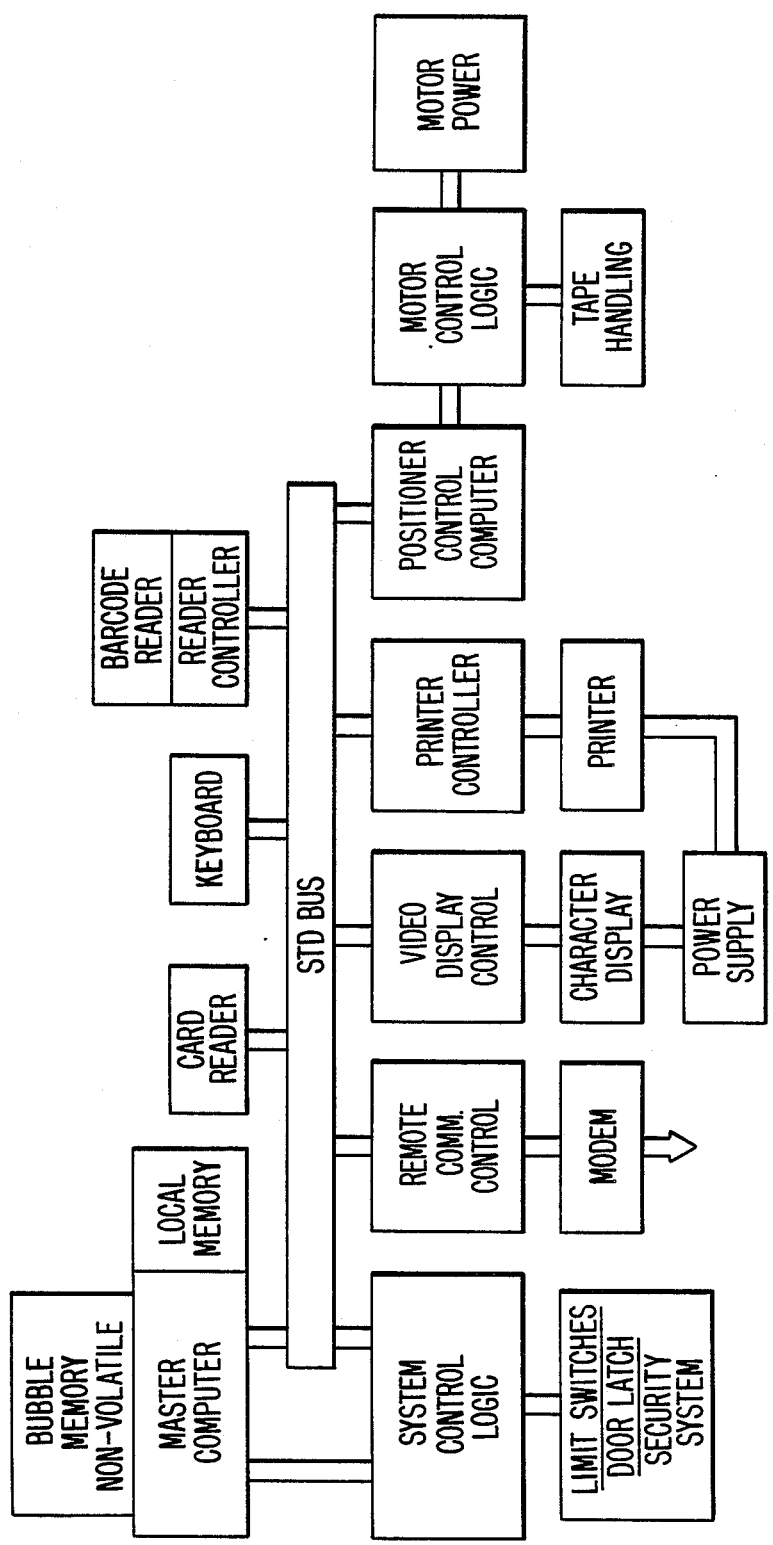
FIG. 10 is a block diagram representation of the control system for the vending apparatus shown in FIG. 1.
Figure 11:
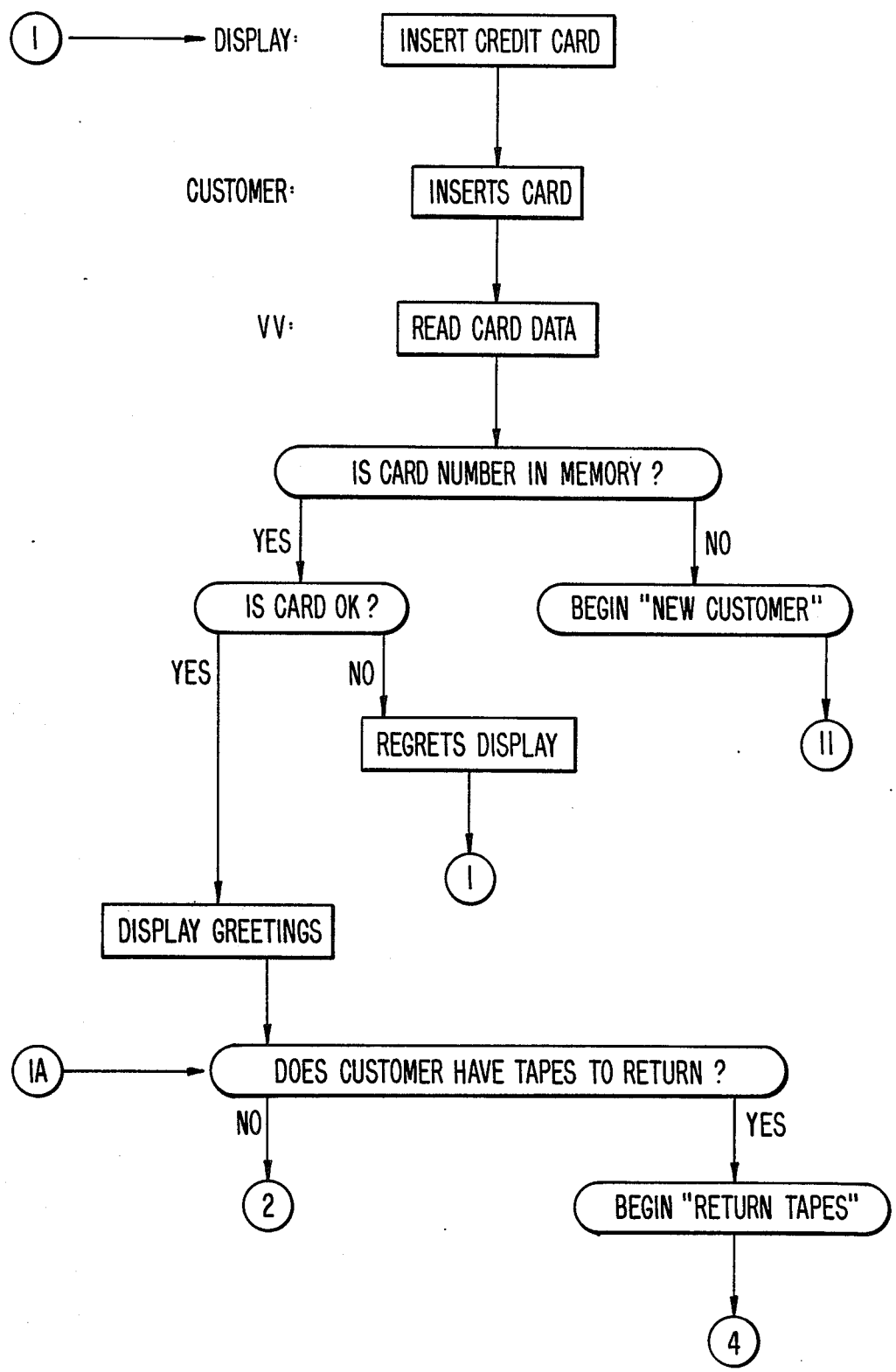
FIG. 11 is a flow diagram representation describing the customer identification sequence of operation of the vending apparatus.
Figure 12:
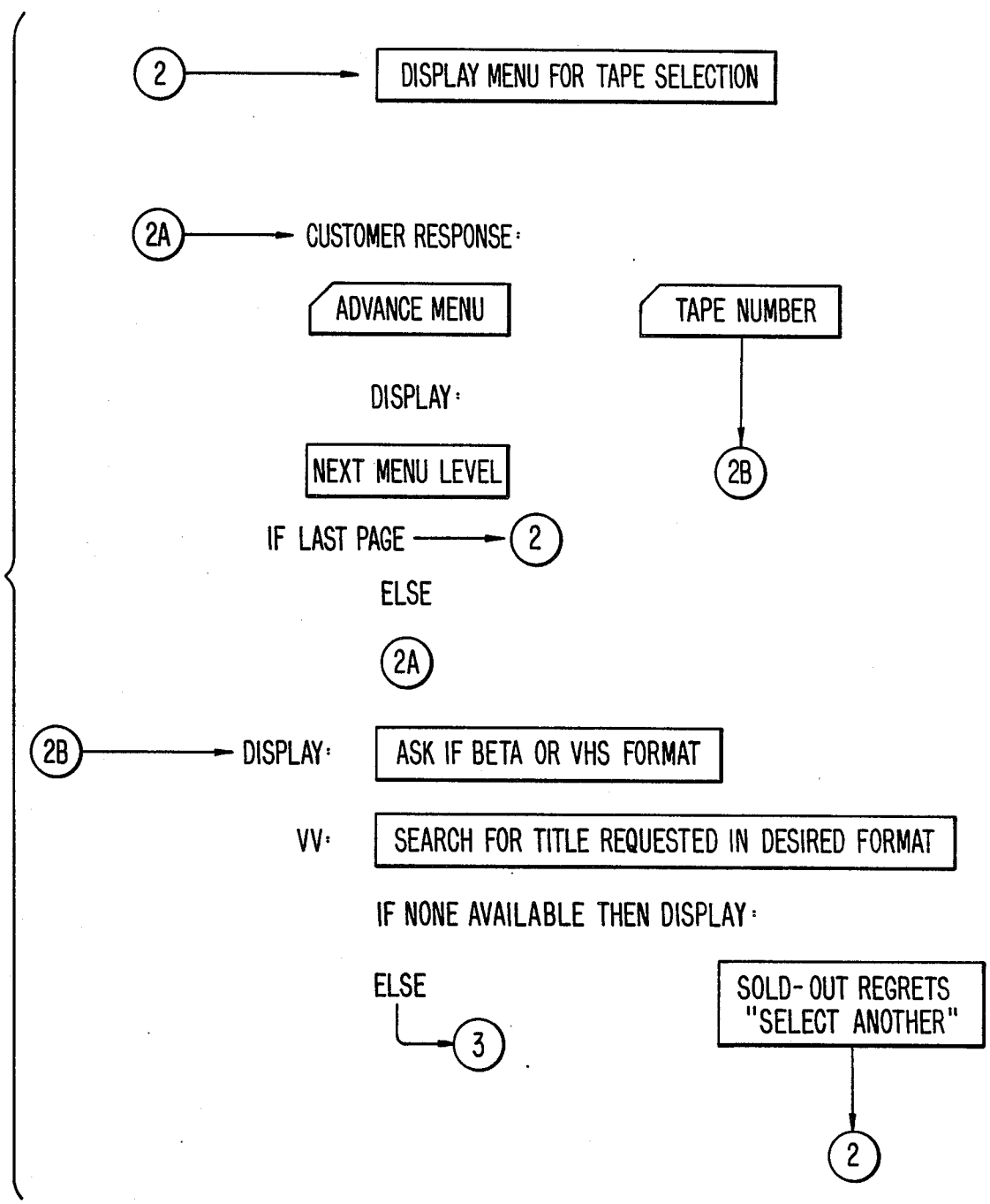
FIG. 12 is a flow diagram representation describing the tape selection sequence of operation of the vending apparatus.
Figure 14:
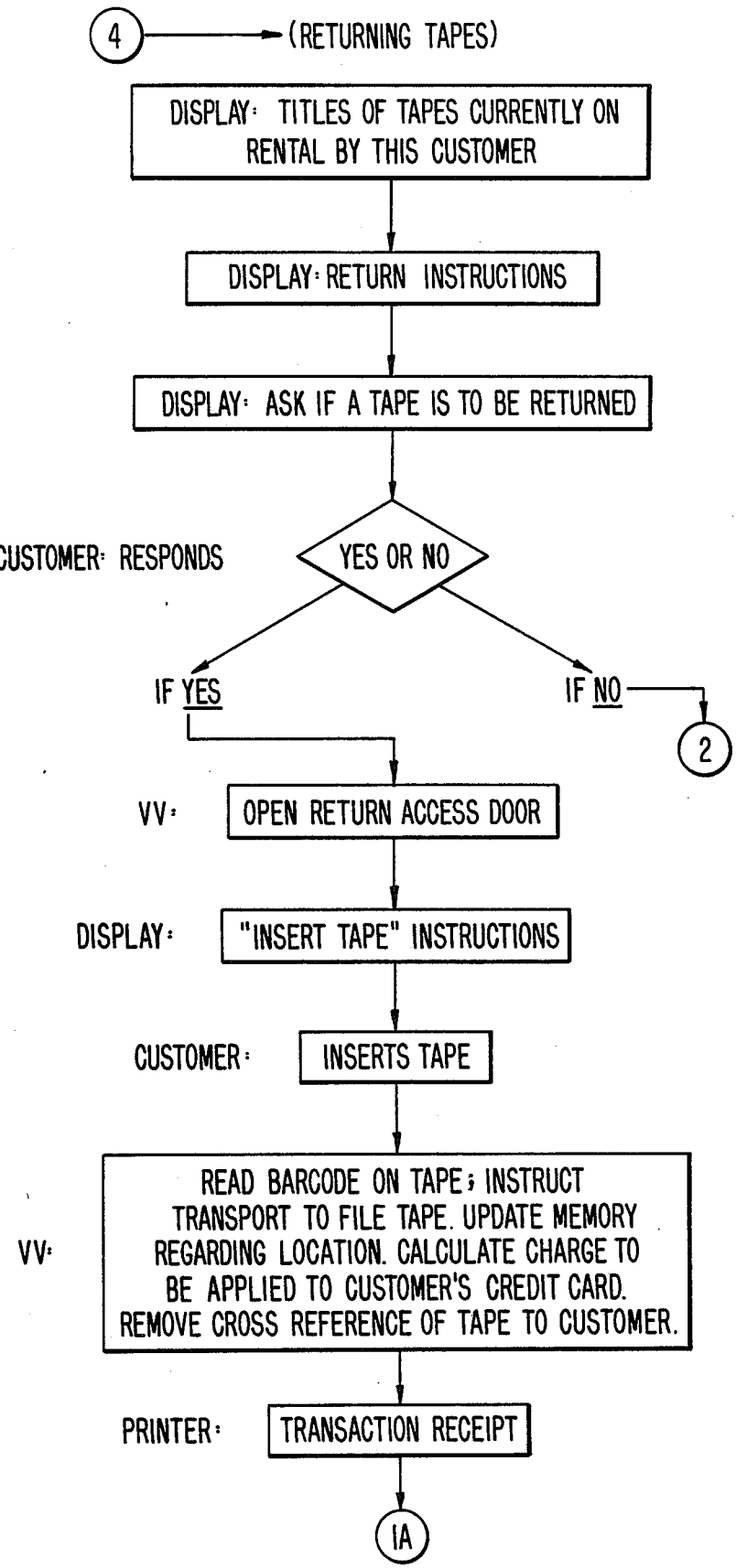
FIG. 14 is a flow diagram representation describing the tape return sequence of operation of the vending apparatus.
Figure 15:
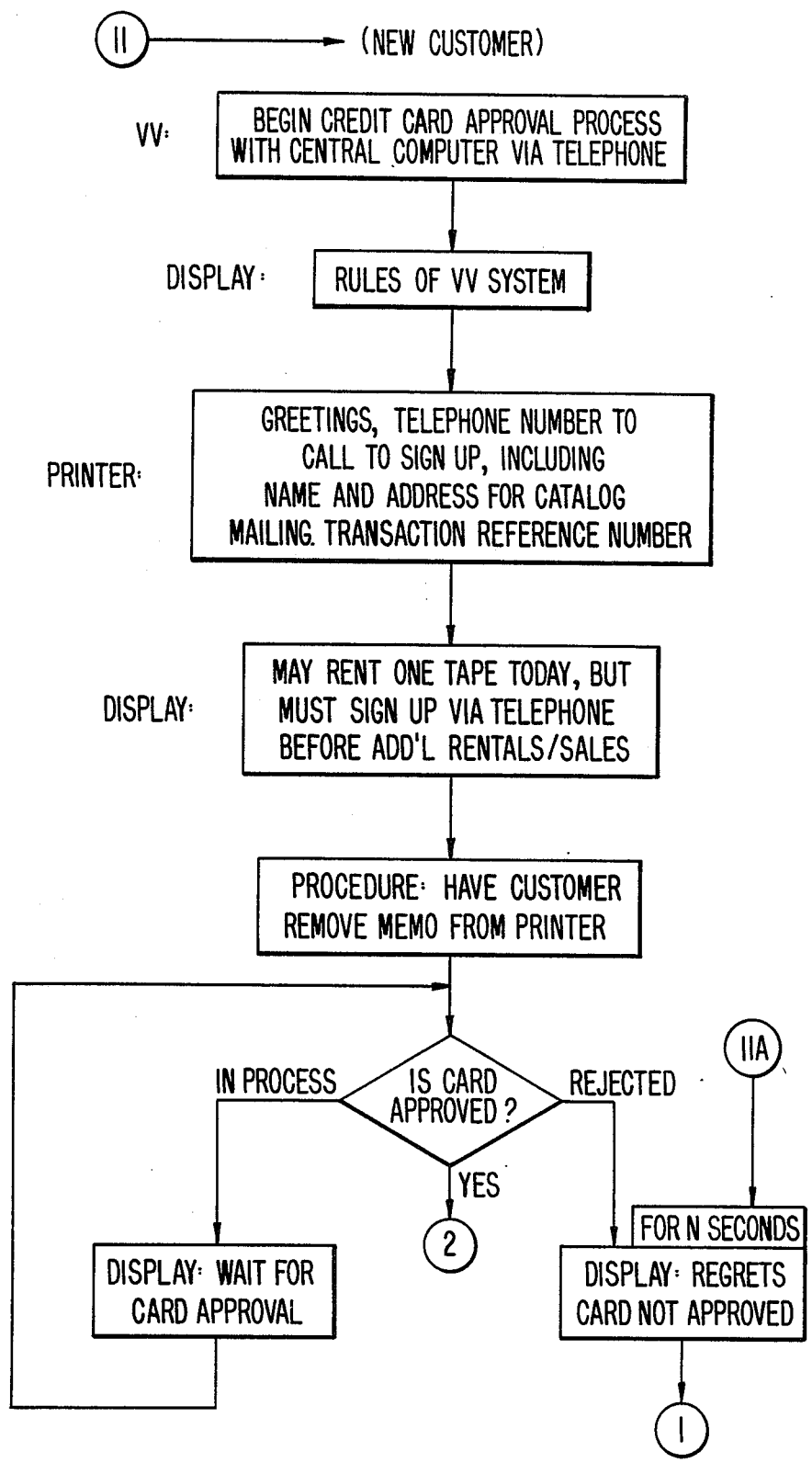
FIG. 15 is a flow diagram representation describing the new customer sign up sequence of operation of the vending apparatus.
Figure 16:
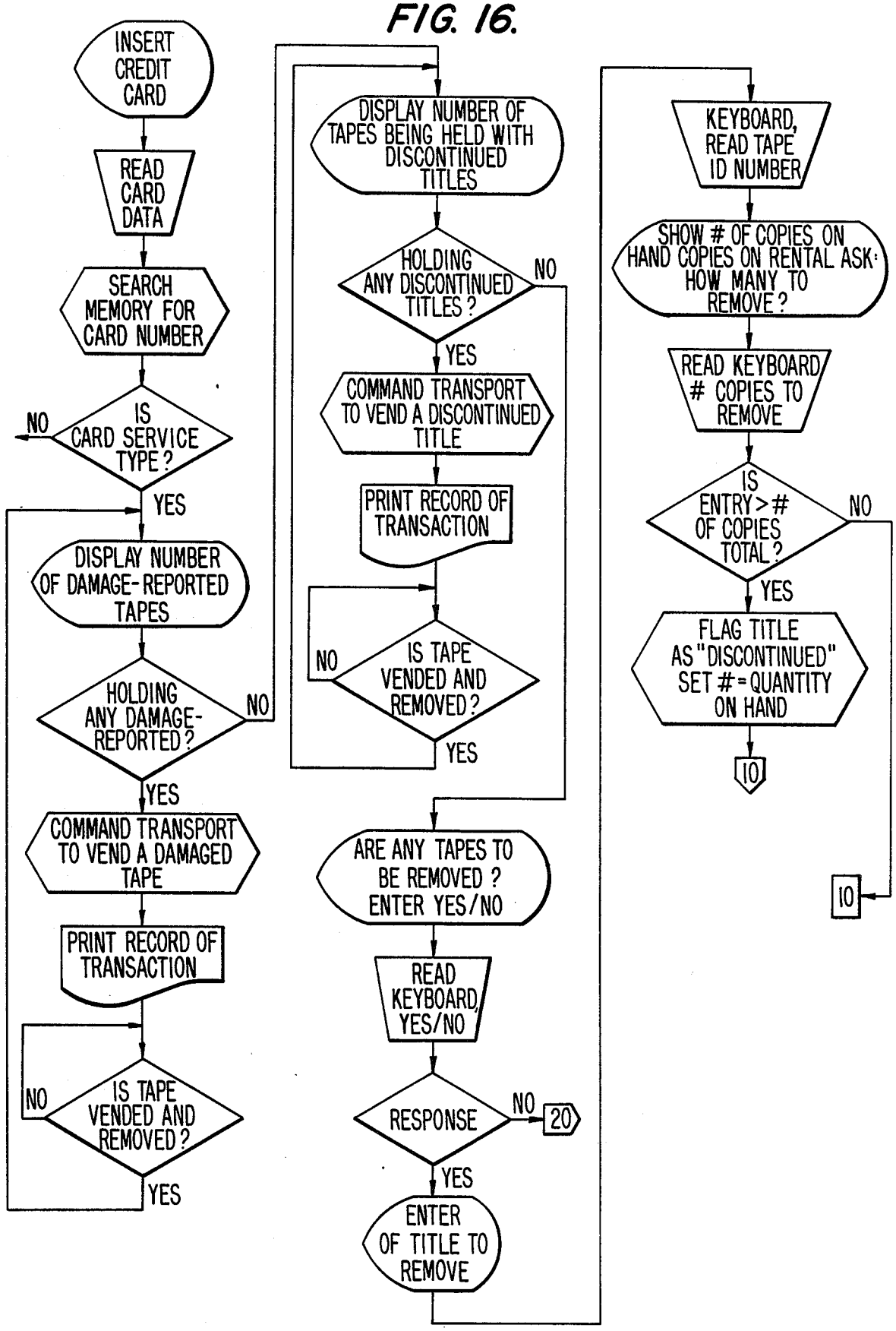
FIG. 16 is a flow diagram representation describing the service call sequence of operation of the vending apparatus.
Figure 17:
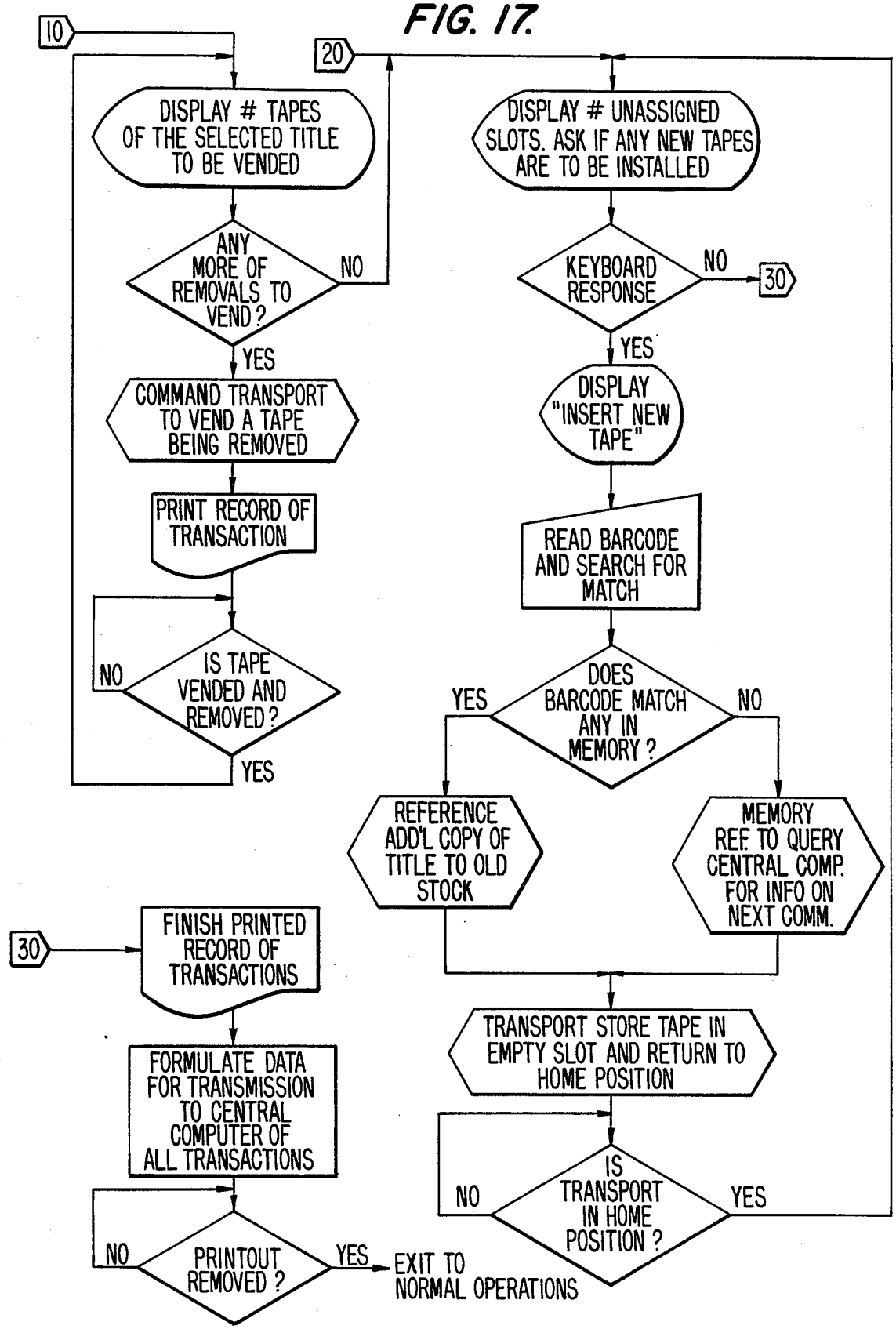
FIG. 17 is a flow diagram representation describing further steps of the service call sequence of operation of the flow diagram shown in FIG. 16.

A suitable microprocessor system is commercially available. For example, the Pro-Log model 7842 microcomputer by Pro-Log, Inc. for the STD BUS System is acceptable for these purposes. A block diagram of the control system is shown in FIG. 10. Additionally, FIGS. 11-17 show flow diagram representations describing the sequence of operation of the dispensing machine. Microprocessor system 104 will be discussed further below in describing the operation of the dispensing machine 10. A menu display 106 is mounted on front panel 16 in communication with microprocessor system 104 for informing the user of dispensing machine 10 of the selections which may be made based on the video cassettes which are presently contained in storage rack 12 of dispensing machine 10.

The vending machine also has input select means for inputting a request for a selected video cassette in a user accessible position. Preferably, a keyboard 108 is positioned on the front panel 16 proximate to the insertion station housing 18. Keyboard 108 includes numbered push button switches which are connected to microprocessor system 104 for coding in a request. Further description of the operation and interrelationship between keyboard 108 and microprocessor 104 will be described below.

Customer identifier means is provided for identifying a customer and either permitting or preventing that customer from further use of the machine. The customer identifier means also allows microprocessor system 104 to identify an account corresponding to the customer, debit that account when a selected video cassette is carried to the vend position from one of the storage positions and credit that account when a selected video cassette is carried to one of the storage positions from the vend position. Microprocessor system 104 records when the cassette is vended and when the cassette is returned and whether the cassette is returned in a damaged condition.

The customer identifier means preferably includes a card insertion slot 110 in the front panel of the machine near the number keyboard 108. Card insertion slot 110 includes conventional card reading means (not shown)

which is capable of reading a magnetic strip or other indicia on the card. This information is transmitted to the microprocessor system 104 to either permit or prevent a customer from further use of the machine by permitting or preventing the machine from responding to a customer's commands.

The microprocessor system 104 also includes validation means such as a program for validating input into the customer identification means and confirming the presence of a selected video cassette prior to debiting or crediting the account. The microprocessor system 104 is programmed to accept certain codes which are associated with the identification cards of customers. This allows the owners of the vending machine to prevent the machine from being used by customers who have failed to pay bills or have violated other conditions for using the machine. In turn, the microprocessor system prevents actuation of keyboard 108 from causing the machine to operate.

In addition, microprocessor system 104 is programmed to confirm the presence of a selected video cassette prior to debiting or crediting the account of a customer. Microprocessor system 104 receives input from reader head 97 which reads bar code 102 of a video cassette through window 100 in video cassette case 98 when vending the video cassette to a customer. Upon vending the cassette, the identity of the cassette is confirmed to avoid the possibility of an error resulting from incorrect storage of a video cassette. When the video cassette is returned by a customer, microprocessor system 104 compares the code which is read to records listing video cassettes which had previously been issued but not returned by the customer identified by the identification card which had been inserted into the machine. In this way, the proper number of days for the rental charge can be computed upon return of a video cassette and the account can be properly credited with the return of the cassette.

Microprocessor system 104 includes memory means for recording empty cassette storage positions that become vacant upon vending of video cassettes stored in these storage positions. When a video cassette is returned to opening 20 in the insertion station for credit, microprocessor system 104 directs motors 40 and 44 of the positioning means to an empty cassette storage position as recorded in the memory means of microprocessor system 104. The video cassette is then housed in that storage position and its position is recorded in the microprocessor system 104. This allows the machine to indicate the availability of the particular video cassette to a subsequent customer and may provide a subsequent customer with that video cassette. Thus, a trained service person is not required to manually restock the returned video cassettes in storage positions and program the machine to recall the location of such restocked video cassettes.

The vending machine includes means for allowing a service person to remove all video cassettes with an undesired title from the machine and restock the machine with video cassettes having a newly released title. The customer identifying means includes means for identifying a service person, and the input select means includes means for requesting all copies of a selected video cassette so that all copies of a selected video cassette in the video cassette storage positions are serially and continuously carried to the vend position.

This is accomplished by providing service people with identification cards which are generally similar to the identification cards for regular customers. The means for identifying a service person includes a program in microprocessor or system 104 which identifies the machine's user as a service person. Microprocessor system 104 then permits means for requesting all copies of a selected video cassette to be actuated. Such means for requesting all copies includes keyboard 108, which can be used to input such a request, and a suitable program in microprocessor system 104.

Keyboard 108 can be used to command microprocessor system 104 to cause the carrier means 35 to serially and continuously carry all copies of a selected video cassette to the vend position, such as opening 24 in dispensing housing 22. Therefore, a service person need not continuously code in a request for a selected video cassette on keyboard 108 to remove all copies when that particular video cassette is no longer to be offered to customers. This arrangement allows the vending machine to be restocked by service personnel who are not highly trained and who do not require the machine to be opened in order to accomplish their function. The machine is restocked with new video cassettes by a service person in the manner described above with regard to the description of how a customer returns and redeposits a video cassette.

The vending machine also preferably includes printing means for printing a statement of the transactions and issuing the statement to a customer upon completion of a transaction. Such printing means preferably includes a conventional receipt printer 112 positioned in front panel 16 of the vending machine and connected to microprocessor system 104 so that receipt printer 112 prints the details of the transaction on a slip of paper which is issued to a customer. Such details include the identity of the video cassette involved in the transaction, the time and date of the transaction, the charges to be incurred, and the date that the video cassette was either previously dispensed to the customer or the date that the video cassette is due to be returned to the vending machine.

The vending machine is provided with a means for communicating information between the microprocessor memory means such as microprocessor system 104 and an external system 116. The means for communicating information is preferably a communication system 114 including an interface between microprocessor system 104 and a telephone line which allows the microprocessor system to be accessed from a remote location by an external system 116 such as a telephone or a computer which is compatible with the telephone system and microprocessor system 104.

Microprocessor system 104 is preferably programmed to allow a customer to reserve a selected video cassette by telephone to prevent the vending machine from providing a copy of the selected video cassette to a customer who has not reserved that selected video cassette and if the number of copies of the selected video cassette does not exceed the number of reserved copies of the selected video cassette. Microprocessor system 104 includes means for receiving a coded video tape selection inputted by dialing a number on a customer telephone which comprises part of external system 116.

The video tape reservation means also includes means for generating and communicating voiced instructions to the customer. The microprocessor system 104 includes a tone generator for generating a synthesized voice to be transmitted over the telephone lines instructing a customer of the selections available and how to code in a request for a selected video cassette. In response, the customer dials in a number on his telephone corresponding to the code for the video cassette which is to be reserved. The video cassette reservation means includes a program in the microprocessor system 104 which prevents the vending machine from providing a copy of the selected video cassette to a customer who has not reserved the selected video cassette, if the number of copies of the selected video cassette does not exceed the number of reserved copies of the selected video cassette.

External system 116 also preferably includes a central control location for uploading or downloading the memory of microprocessor system 104 so that the owners of the vending machine may have a central data storage of information regarding customers' accounts. In this manner, administration and billing can be centralized. In addition, such a central control location could be used to access microprocessor systems 104 of various machines through communication system 114 to permit or prohibit a customer from using the machines by invalidating the code corresponding to the customer's identification card.

Communication system 114 can also be used to communicate information from an external system 116, such as a central control system, so that microprocessor system 104 can be programmed with information regarding new video cassettes which are to be stored in the machine. This allows menu display 106 to properly display the availability of such new video cassettes to customers and allow the machine to know where the new video cassettes are stored without the need for on-location programming of the vending machine.

The vending machine described above is discussed in regard to the vending of video cassettes. It is to be understood that the vending machine as described can be used to vend selected items other than video cassettes and that video cassettes are given as an illustration of the selected item to be vended.

The machine as described operates in the following manner. Customer operations are shown in the flow diagrams of FIGS. 11-15. Service call operations are shown in FIGS. 16-19. A customer inserts a magnetically coded card into card insertion slot 110 where the card is read by a conventional card reader. The data regarding the customer's identity is communicated to microprocessor system 104 which either allows or denies the customer access to the machine. Menu display 106 will display a movie category menu similar to that shown in FIG. 3a and the customer will actuate keyboard 108 to select the general category of his choice on a movie category menu. Menu display 106 will then display a title selection menu such as that shown in FIG. 3b corresponding to the selected movie category. The customer will again actuate keyboard 108 to select the title of the movie of his choice or reject the choices to return to the movie category menu shown in FIG. 3a. If a customer chooses one of the titles, menu display 106 will display information regarding the selected title such as that shown in FIG. 3c.

At this point, the customer commands the vending machine to vend the selection by making an appropriate entry on keyboard 108. Such an entry will be conveyed to the microprocessor system 104 which then causes drive motor 40 and 44 to position carrier means 35 so that fingers 62 and 64 of engaging means 55 are proximate to and engageable with bar 72 of case 70 of a selected video cassette.

Figure 7A:
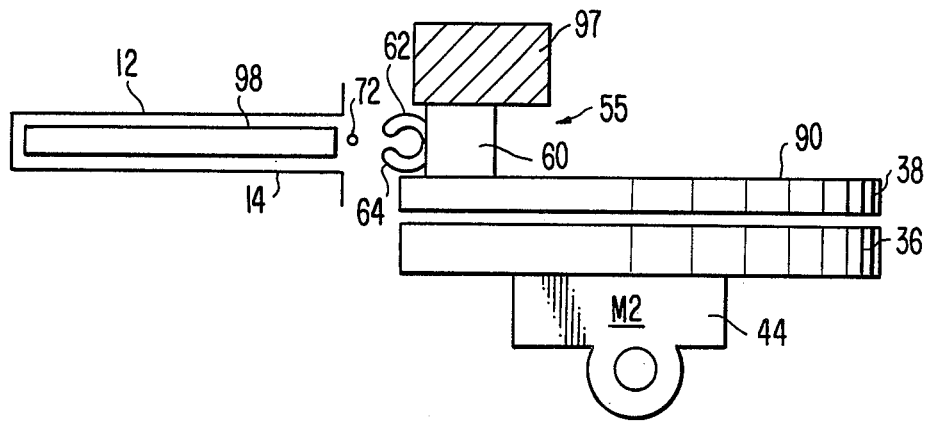
FIGS. 7a, 7b, 7c, and 7d are side elevational views of the carrier means and associated components in various stages of operation.

Microprocessor system 104 positions carrier means 35 proximate to the selected video cassette because microprocessor system 104 contains a listing of the location or locations where the selected video cassette is stored in storage rack 12. Microprocessor system 104 operates drive motor 40 to position itself in the proper vertical position along vertically extending rod 42 and operates horizontally running motor 44 to position itself in the proper horizontal position along horizontally extending rod 46. An illustration of the proximate positioning of carrier means 35 and the selected cassette in storage rack 12 is shown in FIGS. 7a. Engaging means 55 is advanced toward the selected video cassette so that fingers 62 and 64 can engage bar 72 in video cassette case 70 through the actuation of solenoid 68. It is noted that the alternative embodiment shown in FIGS. 6b may be used. In that embodiment, an electromagnet 76 is placed proximate to magnetic material 80 and energized to engage magnetic material 80 in video cassette tape case 78.

Figure 7B:
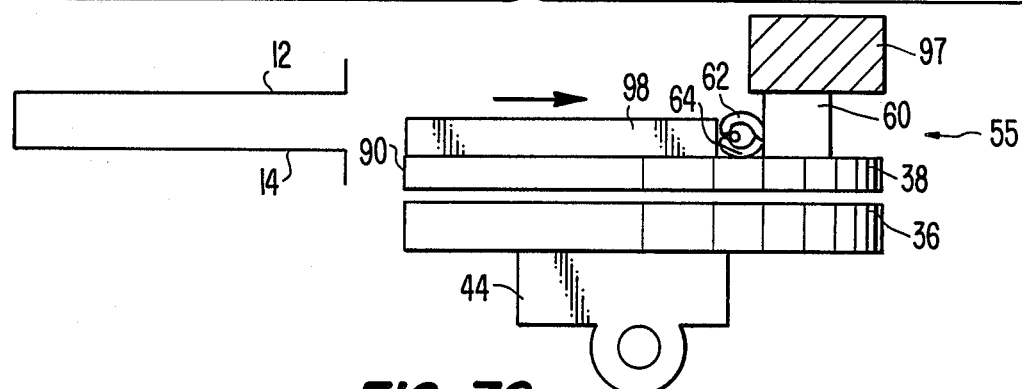

After the video cassette has been engaged by engaging means 55, engaging means 55 is driven by a mechanism such as motors 82 and 84 and belt 86 so that it translates across rotatable table 38 pulling the selected video cassette across top surface 90 of rotatable table 38. Thus, engaging means support 60 translates from the end of rotatable table 38 which is proximate to storage rack 12 as shown in FIG. 7a to the opposite end of rotatable table 38 as shown in FIGS. 7b thereby sliding the selected video cassette along top surface 90 of rotatable table 38.

Carrier means 35 is then positioned so that upper surface 90 of rotatable table 38 is in alignment with the bottom surface of opening 34 in transfer housing 32. Either prior, during, or subsequent to this movement, rotatable table 38 is pivoted relative to base 36 by operation of the motor 81. As can be seen from the drawing, rotatable table 38 pivots from the position shown in FIG. 7b to the position shown in FIG. 7c.

The engaging means, and in particular the engaging means support 60, is again translated across rotatable table 38 to push the video cassette across top surface 90 of rotatable table 38 into opening 34 in transfer housing 32 along the bottom surface of opening 34. As shown in the drawing, the engaging means support 60 moves from the position shown in FIG. 7c to the position shown in FIG. 7d. At this point, the solenoid 68 is operated to release the finger 62 and 64 and the video cassette drops through chute 26 to dispensing station housing 22 so that the customer can take the video cassette from the machine.

Reader head 97 is activated to read bar code 102 on the selected video cassette either during the transport of the tape between storage rack 12 and transfer housing 32 or immediately before or after such transport. Reader head 97 transmits the information read to microprocessor system 104 which records the information and activates receipt printer 112 to print a receipt for the customer. The receipt printer prints information regarding the transaction such as the identity of the selected video cassette, the day the video cassette was vended, the day the video cassette will be due to be returned to the machine, and the charge incurred during the transaction.

The customer can return the video cassette by inserting his magnetic card in card insertion slot 110. The customer identification sequence proceeds as described above and the customer actuates keyboard 108 to indicate that a video cassette is being returned. The customer is told when to proceed and then places the video cassette in opening 20 in insertion station housing 18. The carrier means is positioned proximate to transfer housing 32 so that fingers 62 and 64 can engage bar 72 as shown in FIG. 7d and reverse the sequence recited above to translate engaging means support 60 across rotatable table 38 to the position shown in FIG. 7c, rotate rotatable table 38 to the position shown in FIG. 7b, and translate engaging means support 60 across rotatable table 38 to the position shown in FIG. 7a. During this sequence, the carrier means is positioned proximate to a vacant position in storage rack 12 so that when the carrier means reaches the position shown in FIG. 7b, engaging means support 60 will insert the video cassette directly into a storage position in storage rack 12.

Also during this sequence, reader head 97 reads bar code 102 on the video cassette and transmits that information to the memory of microprocessor system 104 so that the machine will be able to correctly access that video cassette when requested by a subsequent customer.

A service person can remove all copies of a selected video cassette to change the available titles by inserting an identification card, which identifies him as a service person, in card insertion slot 110. The microprocessor system 104 will then allow the service person to enter a code on keyboard 108 to allow all copies of a selected video cassette to be transported in the manner described above to the dispensing station housing 22 for removal by the service person without access to the interior of the machine and without having to provide the machine with more than one request for all copies of the selected video cassette. Microprocessor system 104 will command carrier means 35 to remove all video cassettes of the selected title continuously in serial fashion.

The service person can stock the vending machine with a new title by inserting copies of the new video cassette in the same manner outlined above for the customer return operation. In addition, microprocessor system 104 is programmed to remember the locations of the new titles and is provided with information sufficient to display data regarding the new titles on menu display 16 in the manner described above. Preferably, the information regarding the new titles is transmitted from external system 116 such as a central control station. The central control station transmits data through a telephone line to communication system 114 within the machine. Communication system 114 is compatible with external system 116 which transmits the data in a programming format that is compatible with microprocessor system 104 to microprocessor system 104.

In accordance with the present invention, there is provided a method for dispensing a selected item from a storage array in a machine including a plurality of storage positions comprising the steps of manually entering a selection request for the selected item, automatically positioning a carrier proximate to a designated storage position containing the selected item in response to the request, engaging the selected item for movement by the carrier, positioning the carrier and the engaged selected item at a vend position, recording the empty condition of the designated storage position in a memory system, and dispensing the selected item to a customer.

As embodied in FIG. 1, vending machine 10 includes a plurality of storage positions in the form of a two-dimensional array of supports 14 constituting storage rack 12. The selected item preferably includes a video cassette housed in a case 98 which is stored on a support 14 in storage rack 12. A customer manually enters a selection request for a selected item by entering a code corresponding to the selected item on keyboard 108 located on front panel 16 of machine 10. In response to the selection request which is transmitted to microprocessor system 104, a carrier such as base 36 and rotatable table 38 are automatically positioned by microprocessor system 104 which causes motors 40 and 44 to position themselves in the proper vertical and horizontal position respectively on rods 42 and 46 respectively via a rack and pinion arrangement, so that the carrier is proximate to a designated storage position. In particular, top surface 90 of rotatable table 38 is aligned with and proximate to support surface 14 in a storage position containing the selected item.

The selected item is engaged for movement by the carrier by engaging means such as fingers 62 and 64 which engage bar 72 on the cassette case as shown in FIGS. 6a and 7a. Alternatively, the engaging means may include the electromagnet 76 which can be joined to magnetic material 80 in a cassette case as shown in FIG. 6b. The carrier and the engaged selected item are positioned at a vend position through the sequence shown in FIGS. 7a, 7b, 7c and 7d in a sequential manner.

In particular, the engaging means support 60 is translated across top surface 90 of rotatable table 38 to slide the selected item out of support 14 in storage rack 12 onto top surface 90 of rotatable table 38 as shown in the sequence between FIGS. 7a and 7b. Rotatable table 38 is pivoted with respect to base 36 by motor 81 so that it moves between the positions shown in FIGS. 7b and 7c. Engaging means support 60 then translates across rotatable table 38 to position the selected item in a vend position such as opening 34 and transfer housing 32 which communicates with opening 24 in dispensing station housing 22 so that the customer receives the selected item at this point. The empty condition of the designated storage position is recorded in a memory system located in microprocessor system 104 so that a subsequent request for the particular selected item will not cause the carrier to attempt to withdraw the selected item from the previously designated storage position.

Figure 3A:
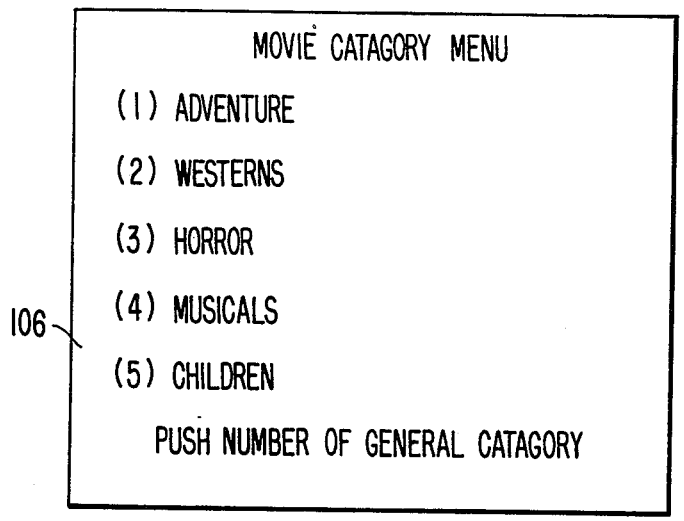
FIGS. 3a, 3b, and 3c illustrate examples of a display which would appear on the front panel shown in FIG. 2.
Figure 3B:
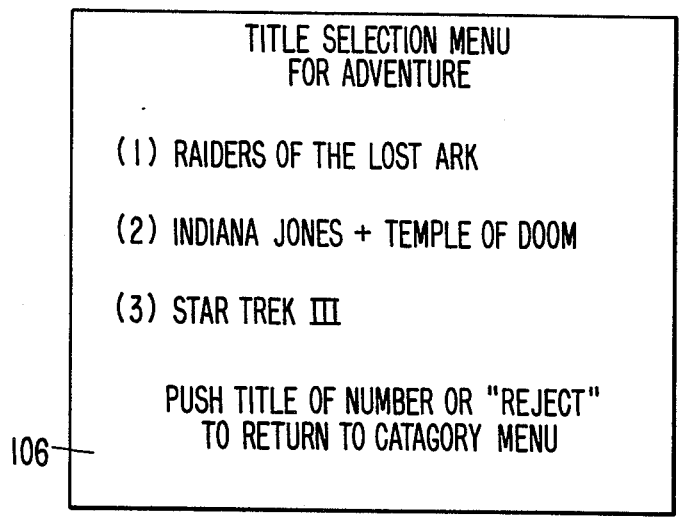
Figure 3C:
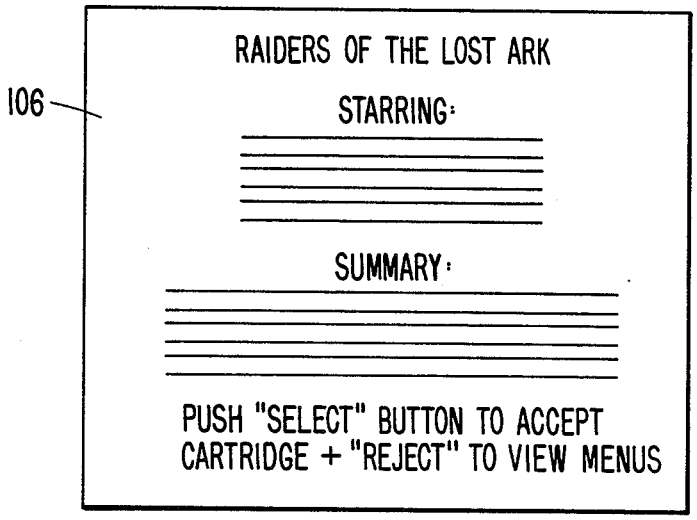

The contents of the storage array are stored in the memory system of microprocessor system 104 and displayed on menu display 106 prior to the time in which a customer enters a selection request on keyboard 108. Examples of such displays are shown in FIGS. 3a, 3b and 3c.

It is preferable that prior to entering a selection request, the customer is identified by the insertion of an identification card into the machine. The identification card is preferably a laminated plastic card similar to a credit card having a magnetic strip having a code that is read by a conventional card reader positioned proximate to card insertion slot 110 in front panel 16. The information from the card reader is transmitted to microprocessor system 104 which either permits or prevents the customer from using the machine.

Prior to dispensing the selected item, an account corresponding to the identification card is debited for the charge of the selected item. Microprocessor system 104 maintains individual accounts corresponding to codes which are entered into the card reader at insertion slot 110 corresponding to each customer. After a selected item such as a video cassette is dispensed, the account stored in microprocessor system 104 is debited for the charge of the selected item and a record is made of the date of the transaction and the identity of the selected item.

It is preferable that after entering the selection request on keyboard 108, a determination is made as to whether the selected item is available. In this way, the customer's account is debited only if the selected item is available. This determination is preferably done by interrogation of the memory system in microprocessor 104 prior to actuation of drive motors 40 and 44 which position the carrier means. If the selected item is available, the dispensing operation will commence and the account will be debited. If the selected item is unavailable, the machine will so indicate by an appropriate message on menu display 106.

In order to confirm the identity of the selected item prior to receipt by a customer, the identity of the selected item is read before the carrier is positioned at the vend position. This is done by reader head 97 which reads bar code 102 on the selected item while the selected item is being transported between storage rack 12 and transfer housing 32. When a selected item is a video cassette, the identity of the selected item would include the title of the program recorded on the video cassette. After the customer has received the selected item, it is preferable that it could be returned at a later time by replacing the selected item in the vend position such as at opening 20 in insertion station housing 18. The identity of the selected item will be read by reader head 97 and the selected item will be engaged for movement with the carrier as described above by engaging means such as fingers 62 and 64.

The carrier will be positioned proximate to the designated storage position for the selected item. The designated storage position is preferably an empty storage position recorded in the memory system. The selected item is redeposited in such a storage position in storage rack 12. The storage position location of the selected item after it has been redeposited in storage rack 12 is recorded in the memory system in microprocessor system 104.

In accordance with the present invention, there is provided a method for redepositing a selected item in a dispensing machine comprising the steps of placing a selected item in a position which is both machine accessible and user-accessible, reading the identity of the selected item, engaging the selected item for movement with a carrier positioning the carrier proximate to a designated storage position for the selected item, and depositing the selected item in the designated storage position.

As embodied in FIG. 1, the selected item is a video cassette in case 98 which is redeposited by placing it in opening 20 in insertion station housing 18 which communicates with opening 34 and transfer housing 32 wherein the openings of such housings are machine accessible by finger 62 and 64 of the engaging means and user-accessible since the user is able to place the video cassette in such a location.

The identity of the selected item is read by reader head 97 which reads a bar code 102 which appears on the video cassette so that it can be seen through window 100 on case 98. Such information is transmitted to the memory of microprocessor system 104. The selected item is engaged for movement with the carrier by fingers 62 and 64 if the embodiment in FIG. 6a is used, or by electromagnet 76 if the embodiment shown in FIG. 6b is used. The selected video cassette is engaged for movement with a carrier such as rotatable table 38 which is rotatable with respect to base 36 as described above.

Figure 7C:
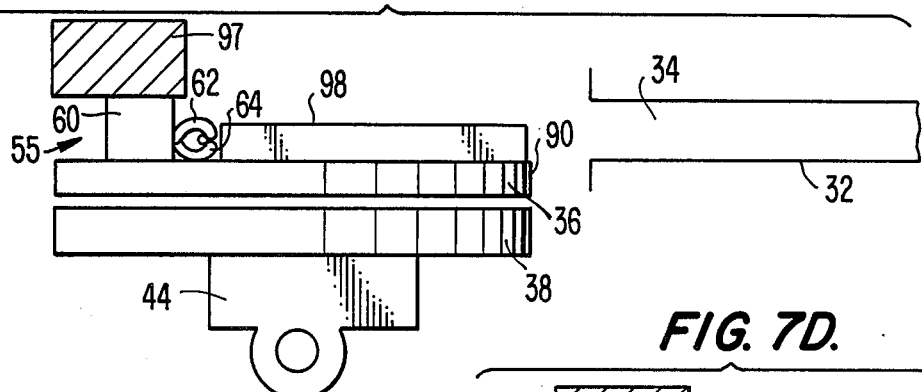
Figure 7D:
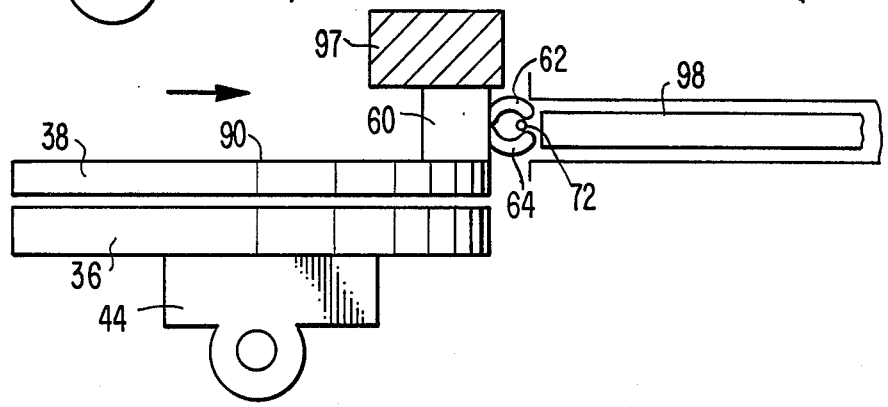

The carrier is positioned proximate to a designated storage position for the selected item through the movement of the carrier between the positions successively shown in FIGS. 7d, 7c, and 7b as discussed above. A designated storage position for the selected item is an empty storage position such as support 14 in storage rack 12 as shown in FIG. 7b. The selected item is deposited in the designated storage position by the movement of the engaging means support 60 along rotatable table 38 between the position as shown in FIGS. 7b and 7a as described above.

The location of empty storage positions are recorded in the memory system and the identity of the selected item and the storage position location of the selected item are recorded in the memory system after the selected item is deposited into the designated storage position as described above. Prior to the redepositing operation, an identification card as described above is inserted into the machine at card insertion slot 110 to be read by a card reader in a conventional manner. After the identity of the selected item is read by reader head 97 in the manner discussed above, an account corresponding to the identification card is credited by entering the appropriate data into an account corresponding to the code of the identification card which is stored in microprocessor system 104.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the applicant's general inventive concept.

What is claimed is:

1. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identity and location of the stored items;

means for accepting user input for selecting or returning an item;

carrier means for selectively transferring a selected item between one of said storage positions and said vend position in response to user input, said carrier means including a rotatable table and means for moving said table to a first position proximate a selected storage position and a second position proximate said vend position;

engaging means slidably connected to said table for selectively engaging and releasing a selected item when said rotatable table is in either of said first and second positions, said engaging means comprising a mechanical finger means;

rotating means for rotating said table so that said engaging means is aligned with a selected storage position or a vend position when said rotatable table is in either of said first and second positions;

means for sliding said engaging means from a home position to an extended position in which the engaging means extends toward a selected storage position or vend position to engage or release a selected item in one of said storage or vend positions;

control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed or returned through the user-accessible opening.

2. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identity and location of the stored items;

means for accepting user input for selecting or returning an item;

carrier means for selectively transferring a selected item between one of said storage positions and said vend position in response to user input, said carrier means including a rotatable table and means for moving said table to a first position proximate a selected storage position and a second position proximate said vend position;

engaging means slidably connected to said table for selectively engaging and releasing a selected item when said rotatable table is in either of said first and second positions, said engaging means comprising a magnetic means;

rotating means for rotating said table so that said engaging means is aligned with a selected storage positon or a vend position when said rotatable table is in either of said first and second positions;

means for sliding said engaging means from a home position to an extended position in which the engaging means extends toward a selected storage position or vend position to engage or release a selected item in one of said storage or vend positions;

control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed or returned through the user-accessible opening.

3. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identify and location of the stored items;

means for accepting user input for selecting or returning an item;

carrier means for selectively transferring a selected item between one of said storage positions and said vend position in response to user input, said carrier means including a rotatable table and means for moving said table to a first position proximate a selected storage position and a second position proximate said vend position;

engaging means slidably connected to said table for selectively engaging and releasing a selected item when said rotatable table is in either of said first and second positions, said engaging means comprising an electromagnet;

rotating means for rotating said table or that said engaging means is aligned with a selected storage position or a vend position when said rotatable table is in either of said first and second positions;

means for sliding said engaging means from a home position to an extended position in which the engaging means extends toward a selected storage position or vend position to engage or release a selected item in one of said storage or vend positions;

control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed or returned through the user-accessible opening.

4. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identify and location of the stored items;

means for accepting user input for selecting or returning an item;

carrier means for selectively transferring a selected item between one of said storage positions and said vend position in response to user input, said carrier means including a rotatable table and means for moving said table to a first position proximate a selected storage position and a second position proximate said vend position;

engaging means slidably connected to said table for selectively engaging and releasing a selected item when said rotatable table is in either of said first and second positions;

rotating means for rotating said table so that said engaging means is aligned with a selected storage position or a vend position when said rotatable table is in either of said first and second positions;

means for sliding said engaging means from a home position to an extended position in which the engaging means extends toward a selected storage position or vend position to engage or release a selected item in one of said storage or vend positions;

customer identifier means for identifying a customer, for debiting a customer's account when a selected item is carried to the vend position from one of said storage positions and for crediting the account when a selected item is returned; control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed or returned through the user-accessible opening.

5. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identity and location of the stored items;

means for accepting user input for selecting or returning an item;

carrier means for selectively transferring a selected item between one of said storage positions and said vend position in response to user input, said carrier means including a rotatable table and means for moving said table to a first position proximate a selected storage position and a second position proximate said vend position;

engaging means slidably connected to said table for selectively engaging and releasing a selected item when said rotatable table is in either of said first and second positions;

a plurality of individual cases which hold each said separate item, each said case having an attachment means which cooperates with said engaging means;

rotating means for rotating said table so that said engaging means is aligned with a selected storage position or a vend position when said rotatable table is in either of said first and second positions;

means for sliding said engaging means from a home position to an extended position in which the engaging means extends toward a selected storage position or vend position to engage or release a selected item in one of said storage or vend positions;

control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed ore turned through the user-accessible opening.

6. The dispensing machine of claim 5 wherein each item bears an identification code and each case has an access window aligned with the identification code to permit the reader means to read the identification code.

7. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identity and location of the stored items;

means for accepting user input for selecting or returning an item;

carrier means for selectively transferring a selected item between one of said storage positions and said vend position in response to user input, said carrier means including a rotatable table and means for moving said table to a first position proximate a selected storage position and a second position said vend position;

engaging means slidably connected to said table for selectively engaging and releasing a selected item when said rotatable table is in either of said first and second positions;

rotating means for rotating said table so that said engaging means is aligned with a selected storage position or a vend position when said rotatable table is in either of said first and second positions;

means for sliding said engaging means form a home position to an extended position in which the engaging means extends toward a selected storage position or vend position to engage or release a selected item in one of said storage or vend positions;

service input means for recognizing a service request and for, upon a single service request, dispending all copies of a selecting item through the vend position;

control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed or returned through the user-accessible opening.

8. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identity and location of the stored items;

means or accepting user input for selecting or returning an item;

carrier means for selectively transferring a selected item between one of said storage positions and said vend position in response to user input, said carrier means including a rotatable table and means for moving said table to a first position proximate a selected storage position and a second position proximate said vend position;

engaging means slidably connected to said table for selectively engaging and releasing a selected item when said rotatable table is in either of said first and second positions;

rotating means for rotating said table so that said engaging means is aligned with a selected storage positon or a vend position when said rotatable table is in either of said first and second positions;

means for sliding said engaging means from a home position to an extended position in which the engaging means extends toward a selected storage position or vend position to engage or release a selected item in one of said storage or vend positions;

printing means for printing a statement of predetermined details of the vending transaction and issuing the statement to a customer upon completion of a transaction;

control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed or returned through the user-accessible opening.

9. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identity and location of the stored items;

means for accepting user input for selecting or returning an item;

carrier means for selectively transferring a selected item between one of said storage positions and said vend position in response to user input, said carrier means including a rotatable table and means for moving said table to a first position proximate a selected storage position and as second position proximate said vend position;

engaging means slidably connected to said table for selectively engaging and releasing a selected item when said rotatable table is in either of said first and second positions;

rotating means for rotating said table so that said engaging means is aligned with a selected storage position or a vend position when said rotatable table is in either of said first and second positions;

means for sliding said engaging means from a home position to an extended position in which the engaging means extends toward a selected storage position or vend position to engage or releases a selected item in one of said storage or vend positions;

communication means for communicating information between said memory means and an external, central control, wherein said communication means includes a telephone access line;

control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed or returned through the user-accessible opening.

10. A dispensing machine for holding a plurality of separate items in storage positions and selectively dispensing or receiving the items, the dispensing machine comprising:

a plurality of storage positions which are not user-accessible;

at least one vend position which includes a user-accessible opening;

memory means for storing and processing information about the contents of the storage positions and the identity and location of the stored items;

means for accepting user input for selecting or returning an item;

carrier means for selectively transferring a selected item between one of said storage positions and said vend position in response to user input, said carrier means including a rotatable table and means for moving said table to a first position proximate a selected storage position and a second position proximate said vend position;

engaging means slidably connected to said table for selectively engaging and releasing a selected item when said rotatable table is in either of said first and second positions;

rotating means or rotating said table so that said engaging means is aligned with a selected storage positon or a vend position when said rotatable table is in either of said first and second positions;

means for sliding said engaging means from a home position to an extended position in which the engaging means extends toward a selected storage position or end position to engage or release a selected item in one of said storage or vend positions;

reservation means for allowing a user to reserve a selected item and prevent the dispensing of the last remaining selected item to another;

control means coupled with and combining with said memory means, carrier means, engaging means, rotating means and sliding means for (1) transferring an item from a storage position to a user-accessible opening in response to a user selection and (2) transferring a returned item from a user accessible opening to an empty storage position upon return of the item; and reader means coupled with said memory means for identifying an item which is dispensed or returned through the user-accessible opening.

11. The dispensing machine of claim 9 further comprising means for uploading and down loading information in said memory means to and from said central control.

12. A dispensing machine for holding a plurality of separate videocassettes in storage positions and selectively dispensing or receiving the videocassettes, the dispensing machine comprising:

a plurality of storage positions which are not user-accessible;

at least one vend position which includes a user-accessible opening;

memory means for storing and processing information about the contents of the storage positions and the identity and location of the stored videocassettes;

means for accepting user input for selecting or returning a videocassette;

carrier means for selectively transferring a selected videocassette between one of said storage positions and said vend position in response to user input, said carrier means including a rotatable table and means for moving said table to a first position proximate a selected storage position and a second position proximate said vend position;

engaging means slidably connected to said table for selectively engaging and releasing a selected videocassette when said rotatable table is in either of said first and second positions;

a plurality of individual cases which hold each videocassette, each case having an attachment means which cooperates with said engaging means;

rotating means for rotating said table so that said engaging means is aligned with a selected storage position or a vend position when said rotatable table is in either of said first and second positions;

means for sliding said engaging means from a home position to an extended position in which the engaging means extends toward a selected storage position or vend position to engage or release a selected videocassette in one of said storage or vend positions;

control means coupled with and combining with said memory means, carrier means, engaging means, rotating means and sliding means for (1) transferring a videocassette from a storage position to a user-accessible opening in response to a user selection and (2) transferring a returned videocassette from a user accessible opening to an empty storage position upon return of the videocassette; and reader means coupled with said memory means for identifying a videocassette which is dispensed or returned through the user-accessible opening.

13. The dispensing machine of claim 12 wherein each video cassette bears an identification code and each case has an access window aligned with the identification code to permit the reader means to read the identification code.

* * * * *

UNITED STATES PATENT AND TRADEMARK OFFICE
CERTIFICATE OF CORRECTION

PATENT NO. : 4,812,629

DATED : March 14, 1989

INVENTOR(S) : JAMES P. O'NEIL, et al

It is certified that error appears in the above-identified patent and that said Letters Patent is hereby corrected as shown below:

Claim 3, column 16, line 11; "identify" should be --identity--.

Claim 4, column 17, line 17; a new paragraph should start with "control".

Claim 5, column 18, line 6; "ore turned" should be --or returned--.

Claim 7, column 18, line 40; "form" should be --from--.

Claim 7, column 18, line 47; "dispending" should be --dispensing--.

Claim 7, column 18, line 48; "selecting" should be --selected--.

Claim 9, column 20, line 6; "releases" should be --release--.

UNITED STATES PATENT AND TRADEMARK OFFICE
CERTIFICATE OF CORRECTION

PATENT NO. : 4,812,629

DATED : March 14, 1989

INVENTOR(S) : JAMES P. O'NEIL, et al.

It is certified that error appears in the above-identified patent and that said Letters Patent is hereby corrected as shown below:

Claim 10, column 20, line 55; "end" should be --vend--.

Signed and Sealed this

Twenty-fourth Day of December, 1991

*Attest:*

HARRY F. MANBECK, JR.

*Attesting Officer*  *Commissioner of Patents and Trademarks*